United States Patent [19]
Fujita et al.

[11] Patent Number: 5,121,380
[45] Date of Patent: Jun. 9, 1992

[54] DISC CARTRIDGE SHUTTER

[75] Inventors: Minoru Fujita, Toride; Yoshitake Kato, Ibaraki; Kazuya Fukunaga, Toride, all of Japan

[73] Assignee: Hitachi Maxell, Ltd., Osaka, Japan

[21] Appl. No.: 225,831

[22] Filed: Jul. 29, 1988

[30] Foreign Application Priority Data

Jul. 29, 1987 [JP] Japan ................................ 62-187810
Sep. 11, 1987 [JP] Japan ................................ 62-226609

[51] Int. Cl.$^5$ ............................................. G11B 23/03
[52] U.S. Cl. .................................. 369/291; 360/133; 206/312; 206/444
[58] Field of Search ................ 369/291; 360/133; 206/309, 312, 444

[56] References Cited

U.S. PATENT DOCUMENTS

| | | | |
|---|---|---|---|
| 4,118,748 | 10/1978 | Doering et al. | 360/133 |
| 4,803,678 | 2/1989 | Tanaka et al. | 369/291 X |
| 4,849,844 | 7/1989 | Kato | 360/133 |
| 4,908,726 | 3/1990 | Kato | 369/291 X |

FOREIGN PATENT DOCUMENTS

| | | |
|---|---|---|
| 160538 | 4/1985 | European Pat. Off. . |
| 0160538 | 11/1985 | European Pat. Off. . |
| 0201870 | 11/1986 | European Pat. Off. . |

OTHER PUBLICATIONS

Modern Plastic Encyclopedia, vol. 62, No. 10A, Oct. 1985, MacGraw Hill, New York, New York, USA, p. 472.

*Primary Examiner*—Stuart S. Levy
*Assistant Examiner*—Joseph A. Rhoa

[57] ABSTRACT

A disc cartridge comprising a cartridge case having head insert openings and encasing a disc-type recording medium rotatably mounted therein and a shutter for opening and closing the head insert openings mounted on the cartridge case, the shutter being molded from a synthetic resin material having a water absorbability of not more than 0.05% by weight and a maximum bending strength of not less than 500 kg/cm$^2$. The resulting shutter has a good resistance to deformation by an external force during working, handling and preservation. The shutter also comprises spherical crystals.

20 Claims, 15 Drawing Sheets

DISC CARTRIDGE SHUTTER

BACKGROUND OF THE INVENTION

This invention relates to a disc cartridge, and particularly to a shutter to be provided to open or close head insert openings of the cartridge case.

It has been known that a cartridge housing a disc-type recording medium such as a magnetic disc or an optical disc is engaged with a disc driving device, and subjected to recording and reproduction of information, while housing the disc-type recording medium in the disc cartridge in order to protect the disc-type recording medium from foreign matter such as dust, etc. and simplify the handling of the disc-type recording medium.

In such a disc cartridge, head insert openings are provided for making a recording-reproduction head provided in the disc driving device accessible to the disc-type recording medium in the cartridge case housing the disc-type recording medium in a turnable state. So long as the head insert openings are always left open, dust is liable to enter the cartridge case when not used, or fingers, etc. are liable to come into contact with the recording surface of the disc-type recording medium when handling the disc cartridge, thereby fouling or damaging the recording surface and deteriorating the recording and reproduction. Thus, a shutter for closing the head insert openings, when the disc cartridge is not in use, is usually provided in a slidable state in such a disc cartridge.

As the shutter, a U-shaped shutter made from a thin metal sheet, for example, a thin stainless steel sheet, has been often used owing to the requirements for a smaller shutter thickness, but the metal shutter has a high hardness and scrapes the cartridge case when repeatedly slid over the cartridge case, producing attrition powder, which deposits on the recording medium or the head, causing various troubles. Furthermore, the metal shutter is press-molded and thus does not have too high of a dimensional accuracy. Furthermore, the metal shutter has a large weight and thus the force of inertia leads to such trouble as shutter disengagement or overrun.

In addition to good compatibility with the cartridge case and less attrition of the cartridge case even if slid repeatedly, the following are some of the characteristics required for the shutter:

(1) The resistance to the surrounding atmosphere must be high and changes in the shape with time must be small;

(2) The toughness must be so high that the shutter must not be easily deformed or damaged;

(3) The surface must resist damage and must have a good appearance; and (4) The moldability must be so high so as to meet mass production.

Heretofore, extensive studies have been made of shutter resin materials that can meet these requirements, but no resin material that can satisfy all of these requirements has been found yet. That is, shutter resin materials that can meet some of these requirements have been found. For example, in order to prevent the attrition of the cartridge case, polyacetal resin has been selected as a shutter resin material having a distinguished slidability and good compatibility with the cartridge case. However, the polyacetal resin had a high water absorbability and thus the shutter molded from the polyacetal resin had a poor resistance to the surrounding atmosphere, for example, it was readily deformed at a high temperature and a high humidity such as 45° C. and 90% RH. Thus, the thin closing cover parts of the shutter for closing the head insert openings expanded, deteriorating the appearance or making engagement or disengagement with or from the disc driving device difficult.

In order to increase the bending modulus of elasticity of the shutter and also increase the surface hardness, thereby making the shutter surface less susceptible to damage, it was proposed to use propylene resin containing a specific amount of a filler as a shutter resin material. However, the proposed shutter resin material had a low elastic limit and the shutter molded therefrom undergoes plastic deformation when subjected to a forced displacement.

SUMMARY OF THE INVENTION

An object of the present invention is to provide a disc cartridge with a shutter of high durability, free from the drawbacks of the prior art.

Another object of the present invention is to provide a disc cartridge with a shutter capable of smooth engagement or disengagement with or from a disc driving device and being less susceptible to damage to the shutter surface, free from the drawbacks of the prior art.

The slidability and surface hardness of a shutter can be increased by an appropriate surface treatment without using a resin material, and the bending modulus of elasticity of a shutter can be increased by providing an appropriate auxiliary means without using a resin material. Thus, the basic requirements for the shutter resin material are a smaller water absorbability, no changes in the shape with time, a high toughness and less susceptibility to damage.

The present invention has been established on the basis of these findings and the objects of the present invention can be attained with a shutter molded from a synthetic resin material having a water absorbability of not more than 0.05% by weight and a maximum bending strength of not less than 500 kg/cm$^2$, for example, a crystalline propylene homopolymer, crystalline propylene copolymer, or a crystallizable synthetic resin material, such as polyolefin, containing a crystal nucleating agent.

When a shutter is molded from the resin material having the aforementioned characteristics, the shutter will undergo no changes in shape with time owing to the low water absorbability, and will not be damaged or deformed, even exposed to an external force, owing to the high bending strength. Thus, a disc cartridge with a shutter molded from a synthetic resin material of high durability can be provided according to the present invention.

The shutter applicable to the present disc cartridge is molded from a synthetic resin material having a water absorbability, that is, a maximum water content of the synthetic resin material, of not more than 0.05% by weight and a maximum bending strength, that is, a maximum stress when a test piece is statically bent, of not less than 500 kg/cm$^2$.

When a shutter of U-shaped cross-section e.g. about 48 mm wide, about 32 mm long and about 2.7 mm in width at the linking bridge part, made from a synthetic resin material having a water absorbability of not more than 0.05% by weight is left in a surrounding atmosphere at 60° C. and 90% RH for 24 hours, the maximum deformation at the tip ends on the U-shaped opening sides amounts to not more than 0.02 mm and there is no substantial problem of changes in shape with time. A shutter molded from a synthetic resin material having a maximum bending strength of not less than 500 kg/cm$^2$ has a fast elastic recovery even when subjected to a forced displacement.

As the synthetic resin material, a crystalline polypropylene homopolymer, and a crystalline propylene copolymer can be used owing to a good moldability, and a low specific gravity.

As the crystalline polypropylene, the following commercially available polypropylenes are used, for example:

(1) Ube Polypro J130G, trademark of polypropylene made by Ube Kosan K. K., Japan:
   Maximum bending strength: 550 kg/cm$^2$
   Bending modulus of elasticity: 18,500 kg/cm$^2$
   Tensile Strength: 370 kg/cm$^2$
   Water absorbability: 0.02% by weight
   Impact strength: 2.0 kg.cm/cm
   Thermal deformation temperature: 115° C.

(2) Ube Polypro HX-5-5, Trademark of polypropylene made by Ube Kosan K. K., Japan:
   Maximum bending strength: 540 kg/cm$^2$
   Bending modulus of elasticity: 19,100 kg/m$^2$
   Tensile strength: 337 kg/cm$^2$
   Water absorbability: 0.02% by weight
   Impact strength: 5.5 kg.cm/cm
   Thermal deformation temperature: 129° C.

The shutters molded from crystalline polypropylene homopolymer and crystalline polypropylene copolymer have sometimes a little lower rigidity and are thus a little susceptible to deformation, and a little less returnable to the initial state, once deformed. Furthermore, the shutters sometimes have a little smaller surface hardness and thus are a little more susceptible to damage to the shutter surface, leading to a decrease in the commercial value. In order to improve these properties of the shutter, the present invention further proposes to mold a shutter from a crystallizable synthetic resin material containing a crystal-nucleating agent.

The crystallizable synthetic resin material for use, to this end, in the present invention includes, for example, polyolefins, polyacetal, polyamide, polyethylene terephthalate, and polyvinyl chloride.

The polyolefins include, for example, polyethylene, cross-linked polyethylene, polypropylene, ethylenevinyl acetate copolymer, ethylene-ethyl acrylate copolymer, ionomer, ethylene-propylene copolymer and mixtures thereof.

Among the polyolefins, polypropylene is preferred owing to the high heat resistance, and above all polypropylene having a melt flow rate (MFR) of 20 or more is suitable for the molding of a thin shutter.

The crystal nucleating agent includes, for example, aliphatic saturated dibasic acids, aromatic monocarboxylic acid, and dicarboxylic acids, such as acrylic acid, succinic acid, glutaric acid and adipic acid. The amount of the crystal nucleating agent is not more than 1% by weight on the basis of the crystallizable synthetic resin material.

In the present invention, a filler can be added to the crystallizable synthetic resin material. The filler includes, for example, talc, calcium carbonate, calcium sulfate, magnesium carbonate, magnesium sulfate, aluminum hydroxide, clay, quartz, diatomaceous earth, calcium silicate, aluminum silicate, titanium oxide, magnesium oxide, zinc oxide, etc. in a powdery state or a fibrous state alone or in a mixture, and the content of the filler is about 1 to about 40% by weight and preferably about 5 to about 30% by weight on the basis of the crystallizable synthetic resin material. If the content of the filler is below about 1% by weight, no effect can be obtained even by adding the filler thereto, whereas, if the content of the filler exceeds about 40% by weight, a warping is liable to develop, depending upon the anisotropy at the molding, and the impact strength of the shutter will be so lowered that the shutter may be cracked when hit upon falling. Thus, the content of the filler is properly restricted to the aforegoing range.

Inorganic filler often contains such metals as calcium, magnesium, aluminum, copper and iron in the form of oxides or salts, and high temperature characteristics are often deteriorated by the presence of these metal impurities. To prevent the deterioration, it is desirable to add to the crystallizable synthetic resin material a small amount of hydroxy-4-alkylbenzophenone represented by the following general formula:

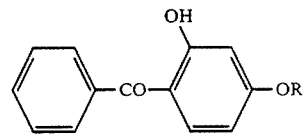

wherein R represents a hydrogen atom or an alkyl group having 1 to 20 carbon atoms. When the number of the carbon atoms of R exceeds 20, the plastic effect and the compatibility with and dispersability in the crystallizable synthetic resin material will be deteriorated.

Among the hydroxy-4-alkylbenzophenones, 2-hydroxy-4-octoxybenzophenone, where R is $C_8H_{17}$, 2-hydroxy-4-dodecyloxybenzophenone, where R is $C_{12}H_{25}$, 2-hydroxy-4-octadecyloxybenzophenone, where R is $C_{18}H_{27}$, are particularly effective. The amount of hydroxy-4-alkylbenzophenone to be added to the polyolefinic resin is about 0.1 to about 8 parts by weight on the basis of 100 parts by weight of the crystallizable synthetic resin material and the filler in total.

BRIEF DESCRIPTION OF THE DRAWINGS

All the drawings illustrate the embodiments of the present invention.

PREFERRED EMBODIMENTS OF THE INVENTION

Specific embodiments of the present disc cartridge will be described in detail below, referring to the accompanying drawings.

Figure 1:
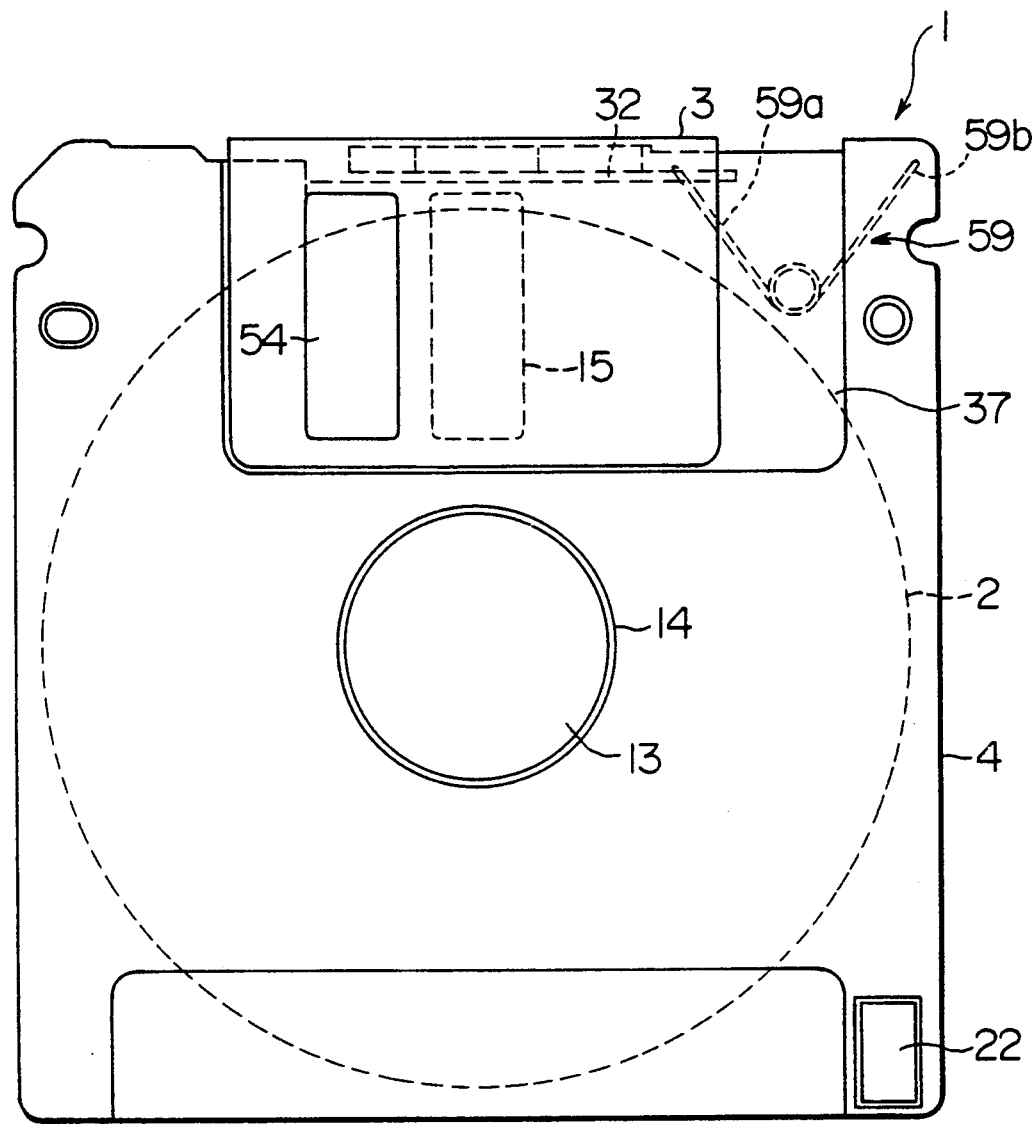
FIG. 1 is a back side view of a disc cartridge.
Figure 2:
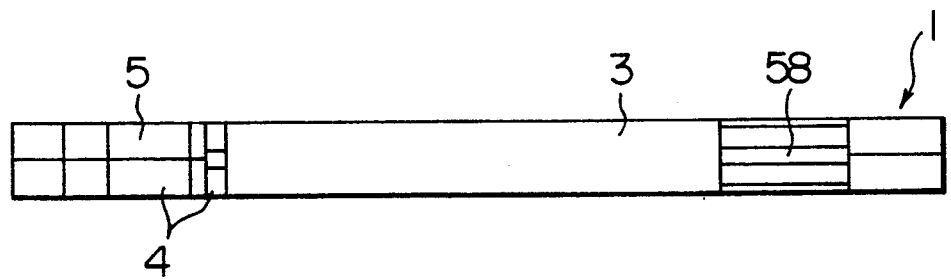
FIG. 2 is a front view, as viewed from the front edge side of the disc cartridge.

In FIGS. 1 and 2, an outlined structure of a disc cartridge according to one embodiment of the present invention is shown, where the disc cartridge comprises a cartridge case 1 made from a synthetic resin, a disc-type recording medium 2 rotatably encased in the cartridge case 1, and a shutter 3 slidably provided along the front edge side of the cartridge case 1 as the main members.

The cartridge case 1 further comprises a lower case 4 and an upper case 5, each shaped in an approximately shallow disc form, and by bonding the lower case 4 to the upper case 5, a space is formed at the inside of the cartridge case 1 for encasing constituent members including the disc-type recording medium 3.

On the inside surface of the lower case 4, a bonding wall 6 is vertically projected up to a predetermined level along the substantially entire outer periphery, and furthermore partition walls 7 are vertically projected up to the same level as that of the bonding wall 6 so as to enclose the four corners of the lower case 4, thereby partitioning a medium-encasing section 8 from other spaces 9, 10, 11 and 12. At the center of the medium-encasing section 8, a center opening 14 is provided so that a metallic hub 13 provided at the center of the disc-type recording medium 2 can be exposed to the outside of the cartridge case 1. Between the center opening 14 and the front edge side (insertion side to a disc driving device), a head insertion opening 15 is provided to make a recording-reproduction head provided in the disc driving device accessible to the disc-type recording medium.

Among the four spaces, a first base, circular opening 16 is provided in the space 9 on the left side of the front edge side, and a higher projection 17 than the level of the bonding wall 6 is provided around the first base circular hole 16. Still furthermore, a first melt adhesion boss 18 is provided at the front edge side corner in the space 9. In the space 10 on the right side of the front edge side, a second base, oblong opening 19 is provided and a projection 20 of the same level as that of the projection 17 is provided around the second base, oblong opening 19. Still furthermore, a second melt adhesion boss 21 is provided at the front edge side corner in the space 10. On the other hand, in the space 11 at the left side of the rear edge side, a rectangular light protector opening 22 is provided near the rear edge side and a third melt adhesion, annular boss 23 of higher level than that of the bonding wall 6 is provided at a position towards the front edge side from the protector opening 22. In the space 12 on the right side of the rear edge side, a fourth melt adhesion, annular boss 24 of higher level than that of the bonding wall 6 is provided.

Figure 3:
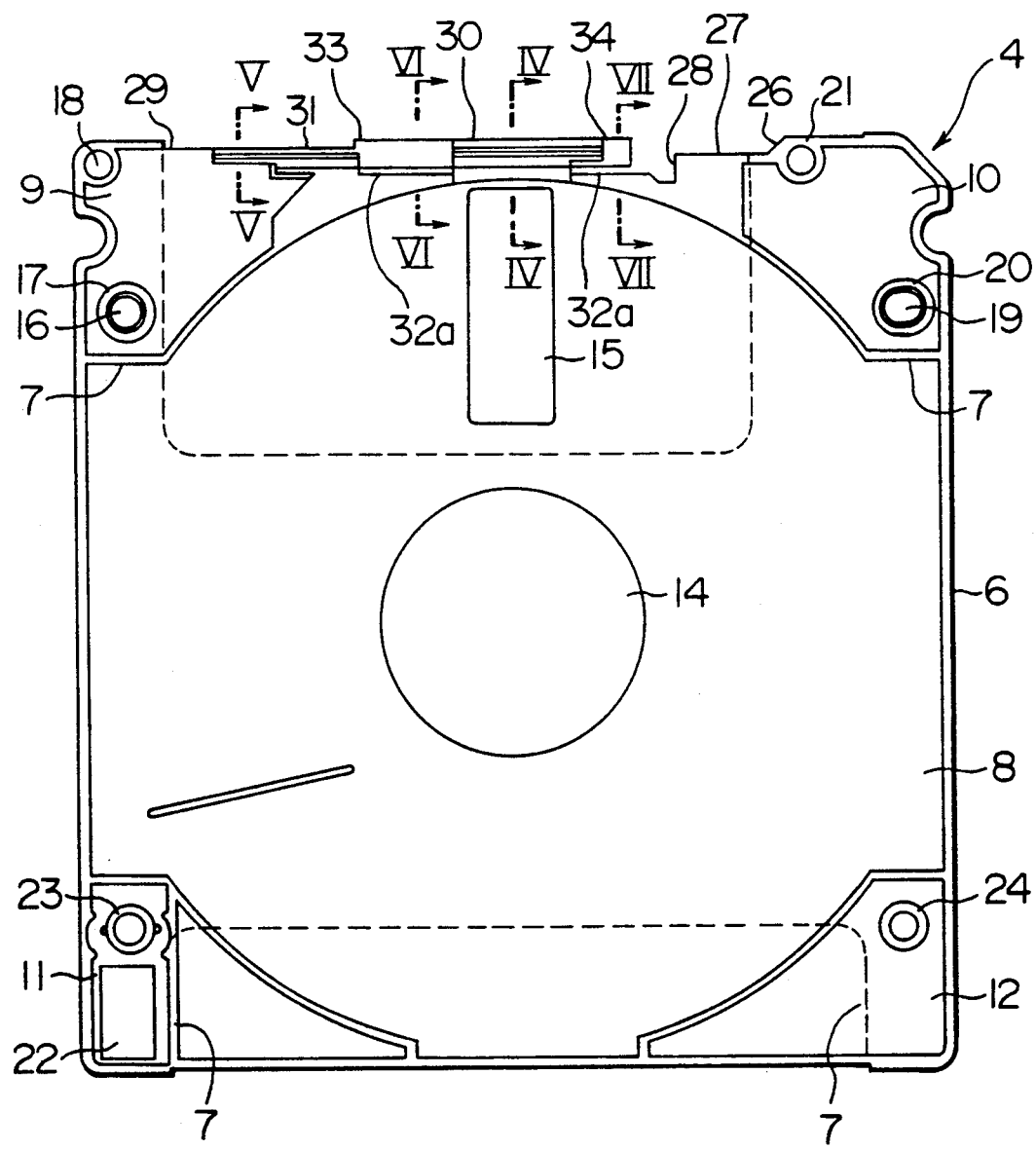
FIG. 3 is a plan view showing the inside of the lower case of the disc cartridge.

On the front edge side, an arm insert stage 26 for opening or closing the shutter 3 by a shutter opening or closing arm provided in the disc driving device, a parallel stage 27 and an engaging stage 28 are provided in succession near one side end (right side as shown in FIG. 3).

Figure 4:
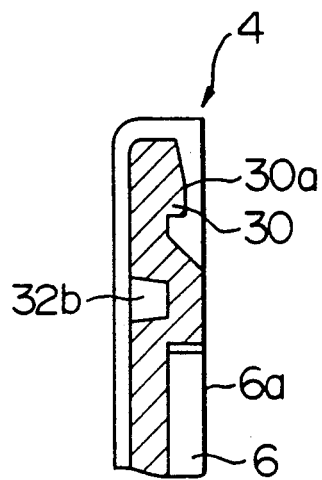
FIG. 4 is a cross-sectional view along the line IV—IV in FIG. 3.
Figure 5:
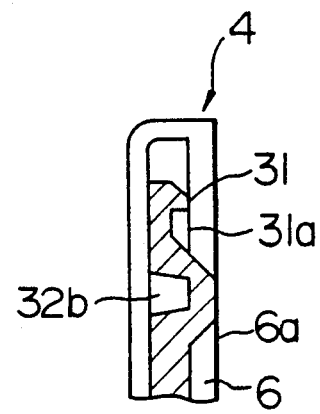
FIG. 5 is a cross-sectional view along the line V—V in FIG. 3.

As shown in FIG. 3, two shutter engaging grooves 30 and 31 are linearly formed along the inside surface of a shutter engaging section nearer to the aforementioned side end and along the inside surface of a shutter travelling stage 29 nearer to the aforementioned side end, respectively. As shown in FIGS. 4 and 5, these two shutter engaging grooves have hook forms having engaging grooves on the inside surface of case 4, respectively. The inside surfaces 30a and 31a of the hook forms are provided in a concave shape over the tip end 6a of the bonding wall 6, and can form a slit between the shutter engaging lug provided on the upper case 5 and the inside surfaces 30a and 31a, when the lower case 4 is bonded to the upper case 5, thereby allowing the shutter to slidably move along the slit.

Figure 6:
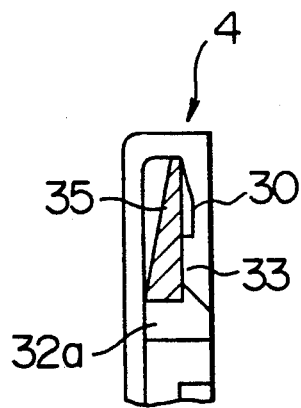
FIG. 6 is a cross-sectional view along the line VI—VI in FIG. 3.
Figure 7:
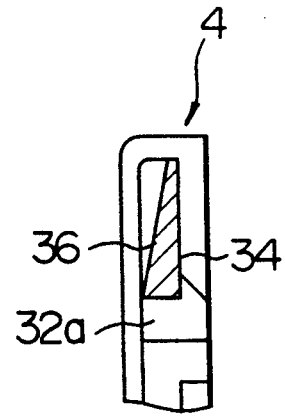
FIG. 7 is a cross-sectional view along the line VII—VII in FIG. 3.

On the other surface of the lower case 4, a shutter sliding groove 32 extended from the engagement stage 28 is formed along the shutter engaging grooves 30 and 31, as shown in FIG. 1. The shutter sliding groove 32 is in the form of slit 32a in the regions approximately up to the two front edge sides of the head insert opening 15, as shown in FIGS. 3, 6 and 7, and is in the from of a concave groove 32b in the other region, as shown in FIGS. 4 and 5. Thus, easily deformable parts 33 and 34 that can easily undergo elastic deformation are formed in the regions facing the slit 32a on the front edge of the lower case 4. Furthermore, on the outer surface of the lower case 4, the easily deformable parts 33 and 34 have slopes 35 and 34, as shown in FIGS. 6 and 7.

Figure 8:
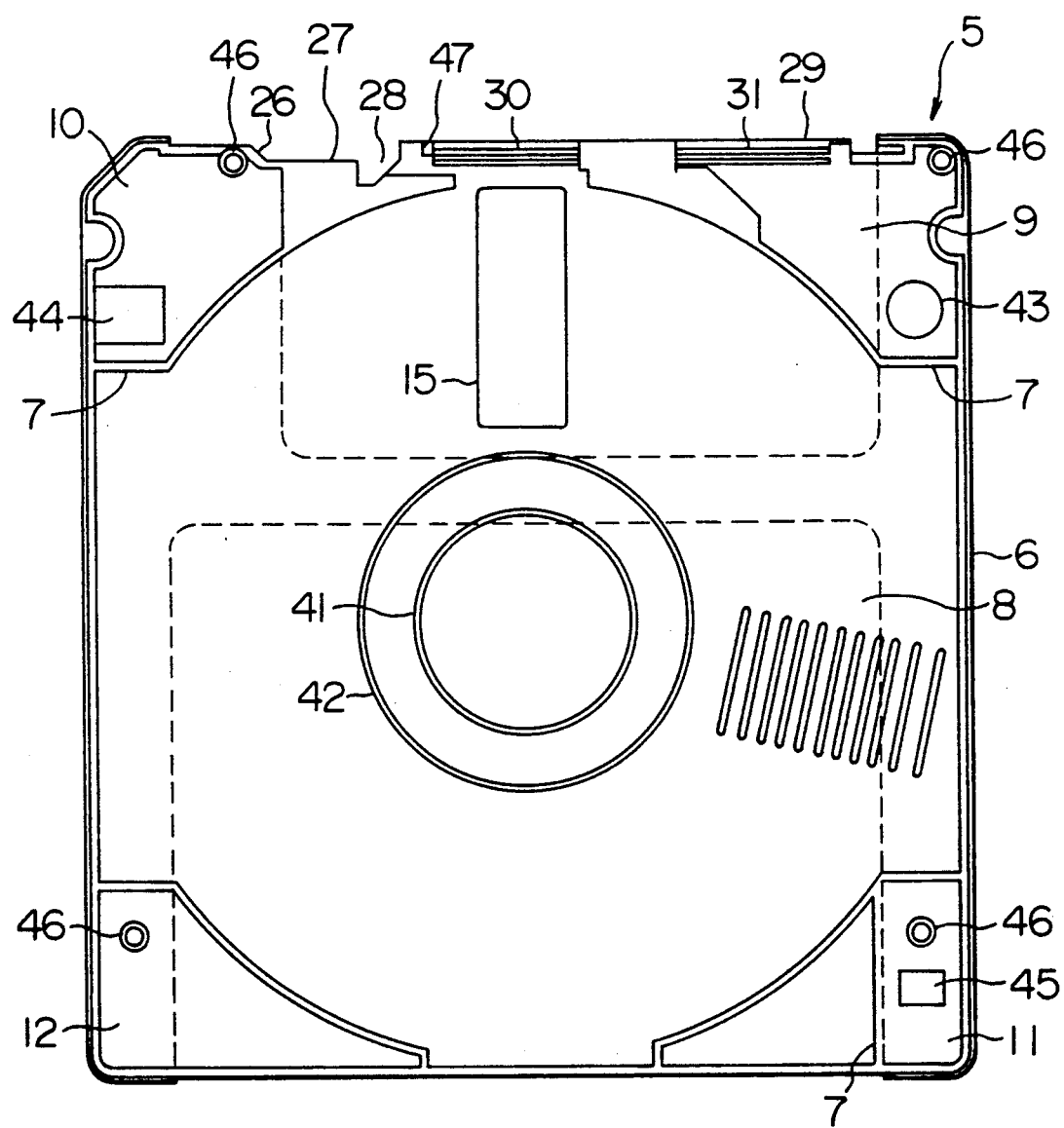
FIG. 8 is a plan view showing the inside of the upper case of the disc cartridge.
Figure 9:
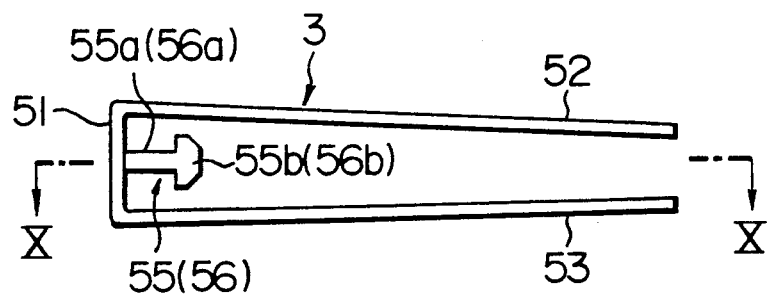
FIG. 9 is a side view of a shutter for the disc cartridge.

The upper case 5 is formed in the substantially same shape as that of the lower case with respect to the entire shape and dimension, as shown in FIG. 8. Thus, the identical parts with those of the lower case 4 will be represented by the identical reference numerals, as shown in FIGS. 3 to 7, and their explanation will be omitted.

An annular projection 41 for encasing the hub 13 provided at the center of the disc-type recording medium 2 is provided at the center of the medium-encasing section 8 on the inside surface of the upper case 5, and another annular projection 42 is concentrically provided around the projection 41.

In four spaces 9, 10, 11 and 12 formed on the upper case 5, the following members are provided to correspond to the respective members provided on the lower case 4. That is, a circular recess 43 acceptable to the tip end of the projection 17 is provided at the position corresponding to the first base opening 16, and a rectangular recess 44 acceptable to the tip end of the projection 20 is provided at the position corresponding to the second base, oblong opening 19. Furthermore, a light protector opening 45 of smaller area than that of the light protector opening 22 is provided at the position corresponding to the light protector opening 22 so as to partially overlap the light protector opening 22. Still furthermore, melt adhesion projections 46 insertable into the first to fourth circular melt adhesion bosses 18, 21, 23 and 24 are provided at the positions corresponding to the first to fourth circular melt adhesion bosses.

On the front edge side of the upper case 5, an arm insert stage 26, a parallel stage 27 and an engaging stage 28, and also two shutter engaging grooves 30 and 31 are formed, as on that of the lower case 4, and a stopper 47 for the shutter 3 is projected at the end of the engaging stage 28 of the shutter engaging groove 30. However, neither shutter sliding grooves nor slopes are provided on the side surface of the upper case 5.

The shutter 3 is molded from the synthetic resin material as described above, and has an approximately U-shaped article comprising a linking bridge member 51 having an approximately equal width to the thickness of the cartridge case and two shutter side members 52 and 53 having a width and a length large enough to enclose the head insert openings 15. The two shutter side members 52 and 53 are at an acute angle with the linking bridge member 51 in a free state before the shutter is mounted on the cartridge case, thereby improving the contact to the lower case 4 and the upper case 5.

Figure 10:
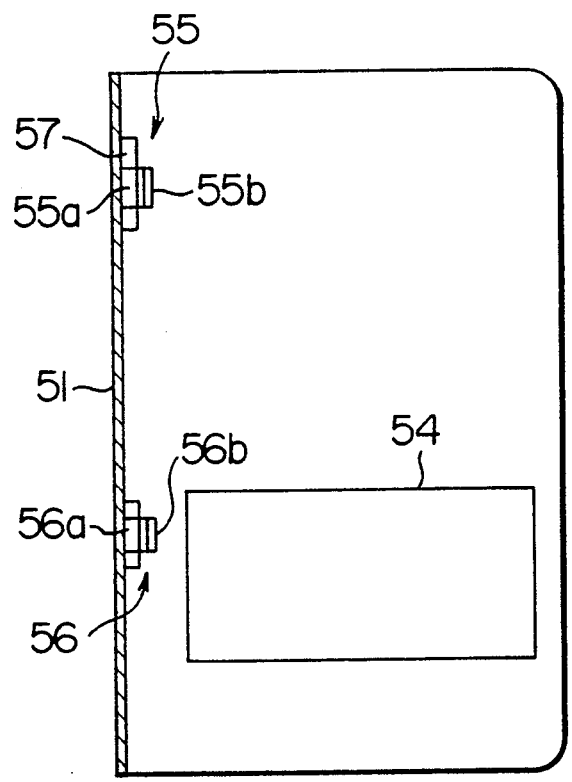
FIG. 10 is a cross-sectional view along the line X—X in FIG. 9.

On the shutter side members 52 and 53, openings 54, which are a little larger than the head insert openings 15, are provided at such a position as to overlap the head insert openings 15 on the lower case 4 and the upper case 5 when the shutter is moved to an open position, as shown in FIG. 1. Furthermore, on the inside surface of the linking bridge member 51 two engaging projections 55 and 56 are vertically provided for engagement with the shutter engaging grooves 30 and 31 provided on the front edge side of the lower case 4 and the upper case 5, so shown in FIG. 10. The engaging projection 55 or 56 comprises a connection part 55a or 56a of smaller width, which can slidably pentrate in the slit formed at the front edge sides of the lower case 4 and the upper case 5 and an engaging head 55b or 56b of larger width which engages with the shutter engaging grooves 30 and 31. Among these two engaging projections 55 and 56, a spring accepting piece 57 is provided on the outside of the engaging projection locating on the right side in FIG. 1.

The present disc cartridge is built up in the following manner:

At first, the disc-type recording medium 2 is encased in the medium-encasing section 8 of the lower case 4 so that the hub 13 fixed at the center of the disc-type recording medium 2 can be exposed to the outside through the center opening 14.

Then, the butting surface 6a of the bonding wall 6 of the upper case 5 is laid on the butting surface 6a of the bonding wall 6 of the lower case 4, so that the melt adhesion projections 46 of the upper case 5 can be inserted into the four melt adhesion bosses 18, 21, 23 and 24 formed on the lower case 4, respectively. These two cases can be bonded to each other by applying an ultrasonic vibration to the insertions of the melt adhesion projections 46 in the respective melt adhesion bosses 18, 21, 23 and 24 in that state.

Figure 11:
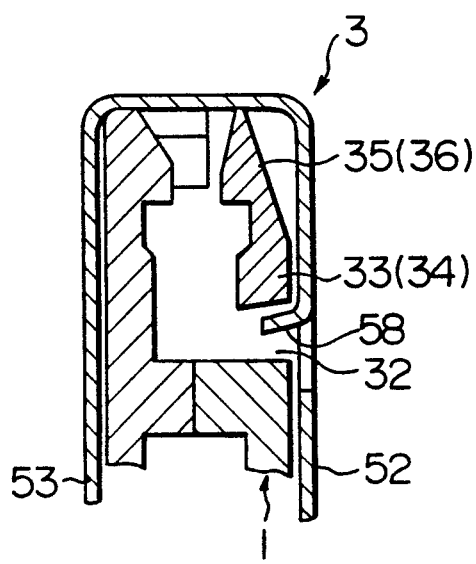
FIG. 11 is a cross-sectional view of the essential part, showing a means for engaging the cartridge case with the shutter.

Then, the shutter 3 is mounted on the cartridge case 1 from the front edge side, while keeping the free ends of the shutter side members 52 and 53 in a slightly opened state. By pushing the engaging projections 55 and 56 formed on the shutter 3 into the front edge side of the cartridge case 1, the engaging heads 55b and 56b of larger width are pushed more inwardly through the front edges of the lower case 4 and the upper case 5 by virtue of the flexing of the shutter side members 52 and 53 and opening of a slit 58, as shown in FIG. 11. When the shutter 3 is moved in a horizontal direction in that state, the engaging members 55b and 56b are engaged with the shutter engaging grooves 30 and 31 and the connection parts 55a and 56a of smaller width are inserted into the slit 58, whereby the shutter 3 can be slidably mounted on the cartridge case 1. Since the shutter 3 can move within the engaging range defined with the shutter engaging grooves 30 and 31, the engaging projections 55 and 56 never travel to the easily deformable parts 33 and 34 during the working and the shutter 3 will never leave the cartridge case 1.

Finally, a spring member 59, such as a twisted coil, is inserted into the cartridge case 1 through the slit 58 and one end 59a of the spring member 59 is engaged with the spring accepting piece 57 formed on the shutter 3, while another end 59b is engaged with the cartridge case at a predetermined point, as shown in FIG. 1, whereby the shutter 3 is set to the closing position of the head insert openings 15.

Opening or closing motion of the shutter 3 will be described as follows.

Figure 12:
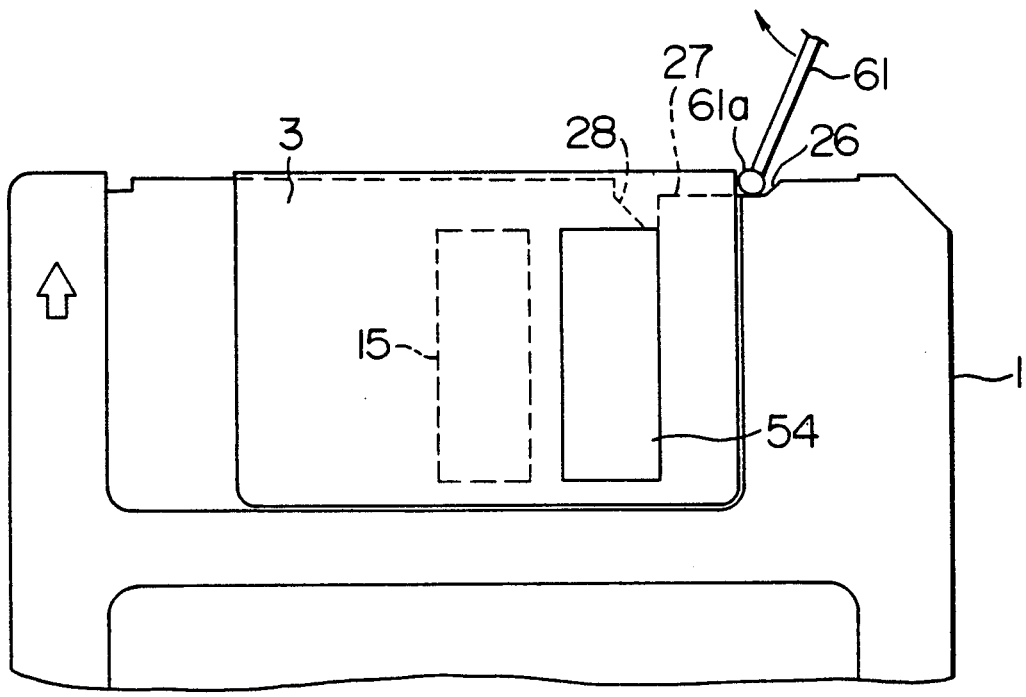
FIGS. 12 and 13 are plan views of the essential part, showing the opening or closing motion of the shutter.

When the disc cartridge is inserted in the disc driving device, the tip end 61a of a shutter-opening or closing arm 61 provided in the disc driving device is brought into the insert stage 26 provided as a recess on the front edge side of the cartridge case 1, as shown in FIG. 12.

Figure 13:
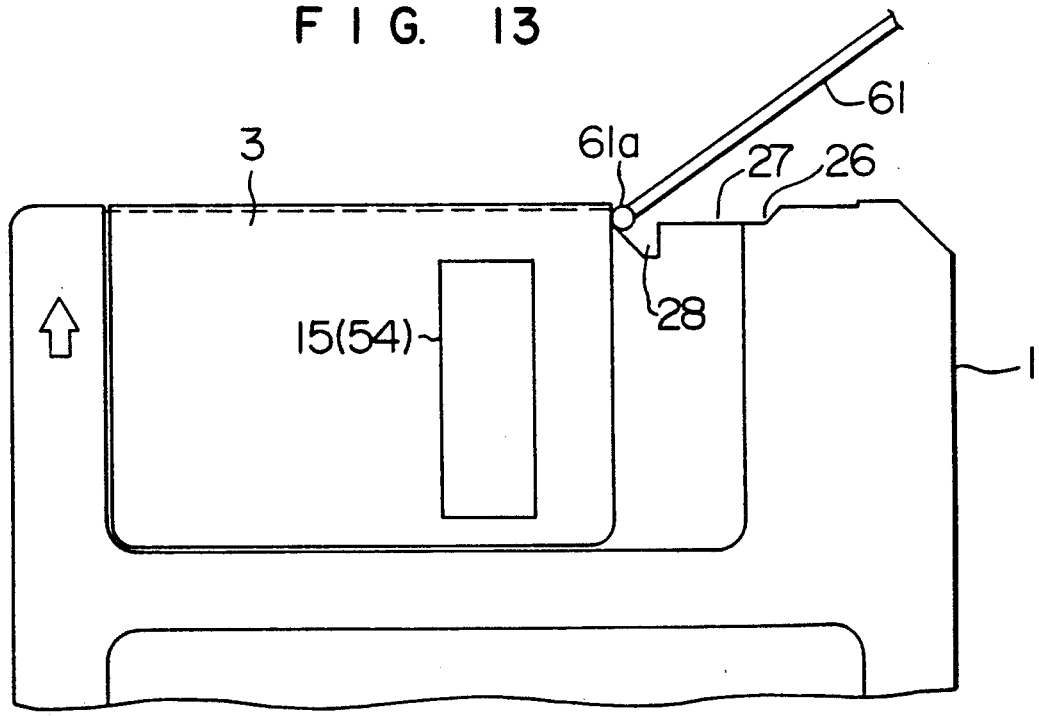

When the disc cartridge 1 is further inserted into the disc driving means, the shutter opening or closing arm 61 is moved in the arrow direction against the resilient force of the spring member 59 owing to the force of insertion, as shown in FIG. 13, and the tip end 61a moves in the shutter-opening direction along the parallel stage 27 of the cartridge case 1.

Finally, the tip end 61 of the shutter-opening or closing arm 61 is engaged with the engaging stage 28, whereby the head insert openings 15 provided on the lower case 4 and the upper case 5 and the openings provided on the shutter 3 are made open.

When the disc cartridge 1 is withdrawn from the disc driving device at the ejection, the tip end 61a of the shutter-opening or closing arm 61 is returned to the insert stage 26 through the engaging stage 23 and the parallel stage 27 by virtue of the returning actions of the springs of the spring member 59 and the arm 61, whereby the shutter 3 is moved along the shutter engaging grooves 30 and 31 by the resilient force of the spring member 59 until the shutter contacts the stopper 47, and the head insert openings 15 are again closed.

Since the disc cartridge according to the foregoing embodiment is provided with the shutter engaging grooves 30 and 31 and the shutter sliding groove 32 for slidably mounting the shutter 3 on the front edge side of the cartridge case 1, any shutter engaging means, for example, such as a type that engaging projections are provided on the inside surface of the shutter side member facing the lower case or such a type as that of the foregoing embodiment where the engaging projections are provided on the inside surface of the linking bridge member of the shutter can be used. Thus, the present invention has a good versatility.

Another embodiment of the present disc cartridge will be described, referring to the accompanying drawings.

Figure 14A:
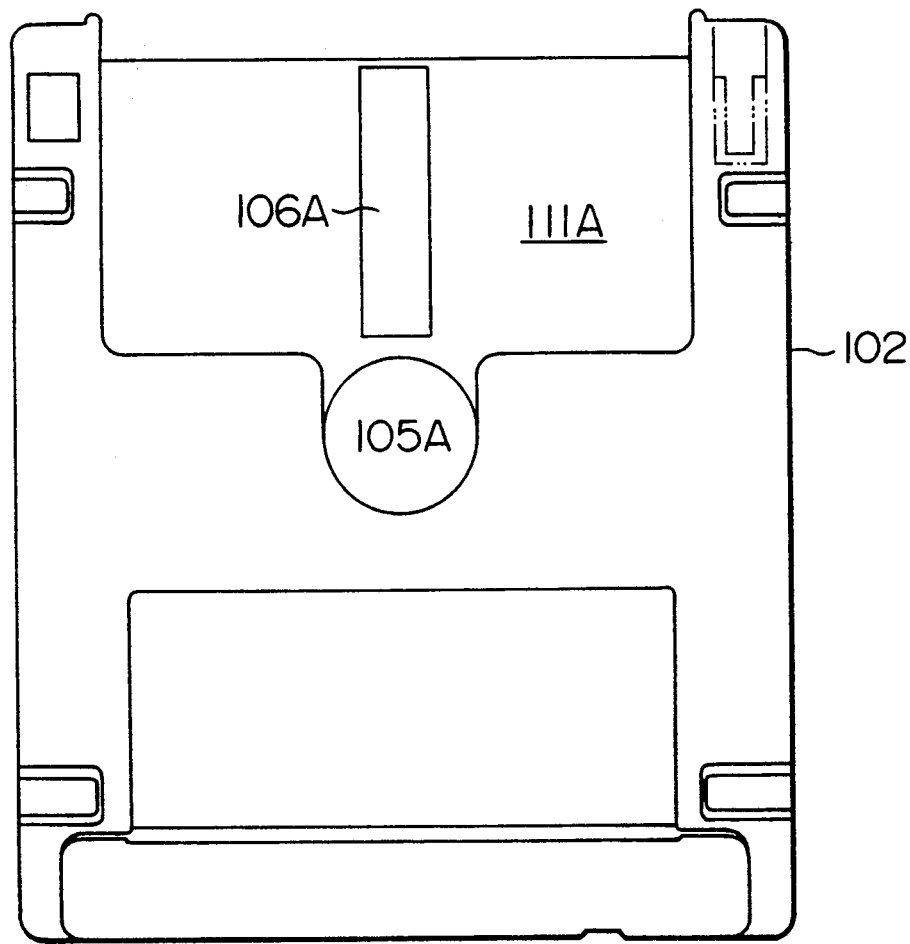
FIGS. 14(a) and (b) represent a plan view and a back side plan view of the upper case of a disc cartridge according to another embodiment, respectively.
Figure 14B:
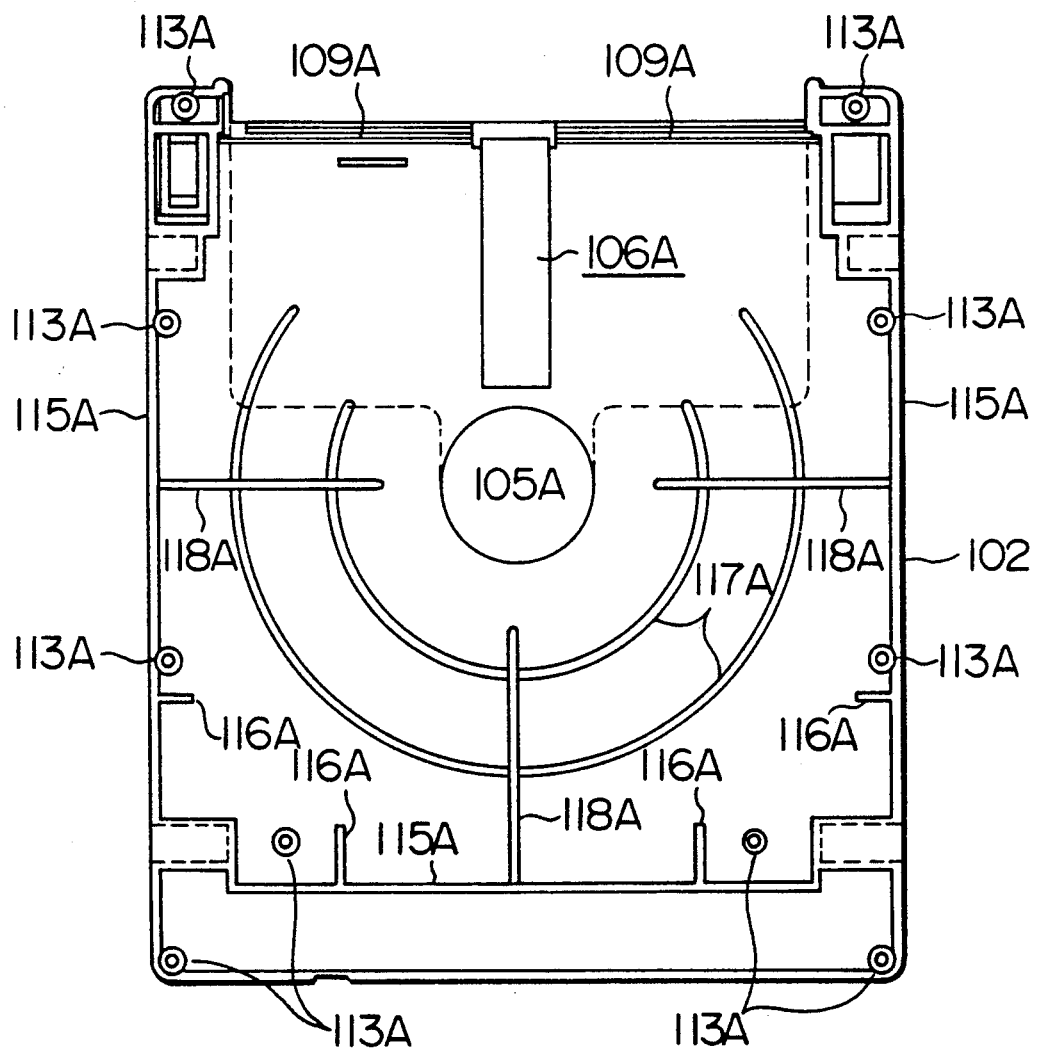
Figure 15A:
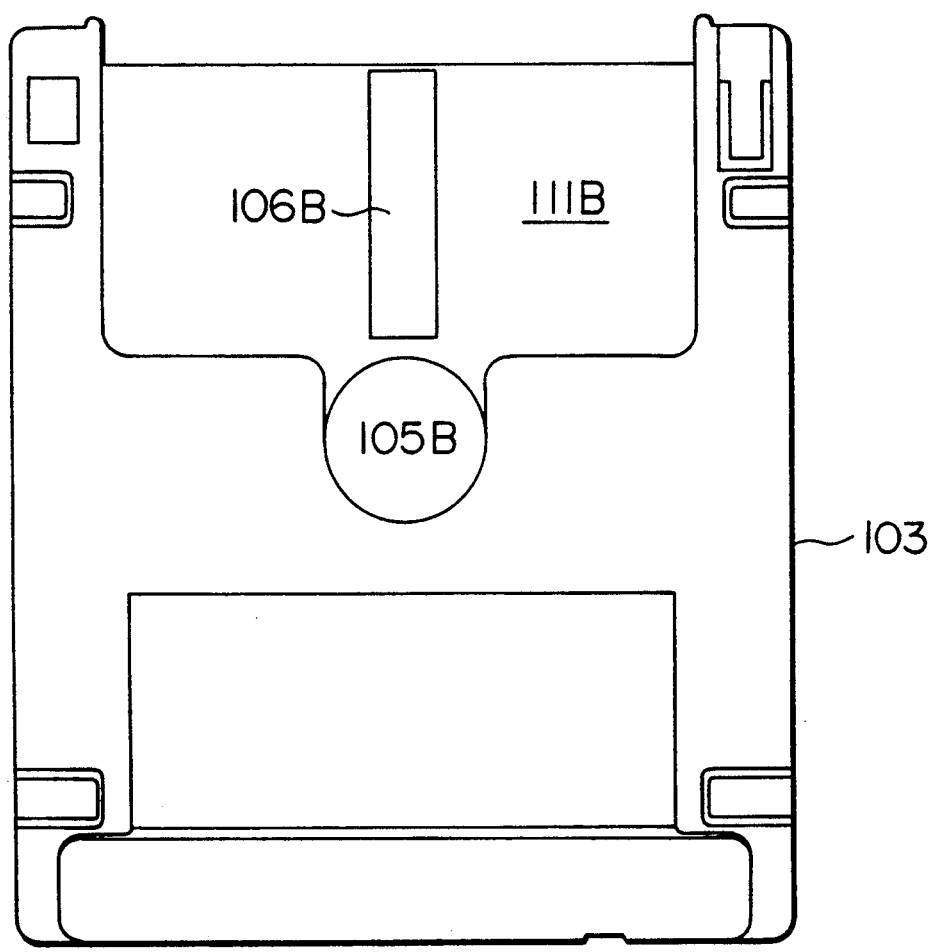
FIGS. 15(a) and (b) represents a back side plan view and a plan view of the lower case of the disc cartridge, respectively.
Figure 15B:
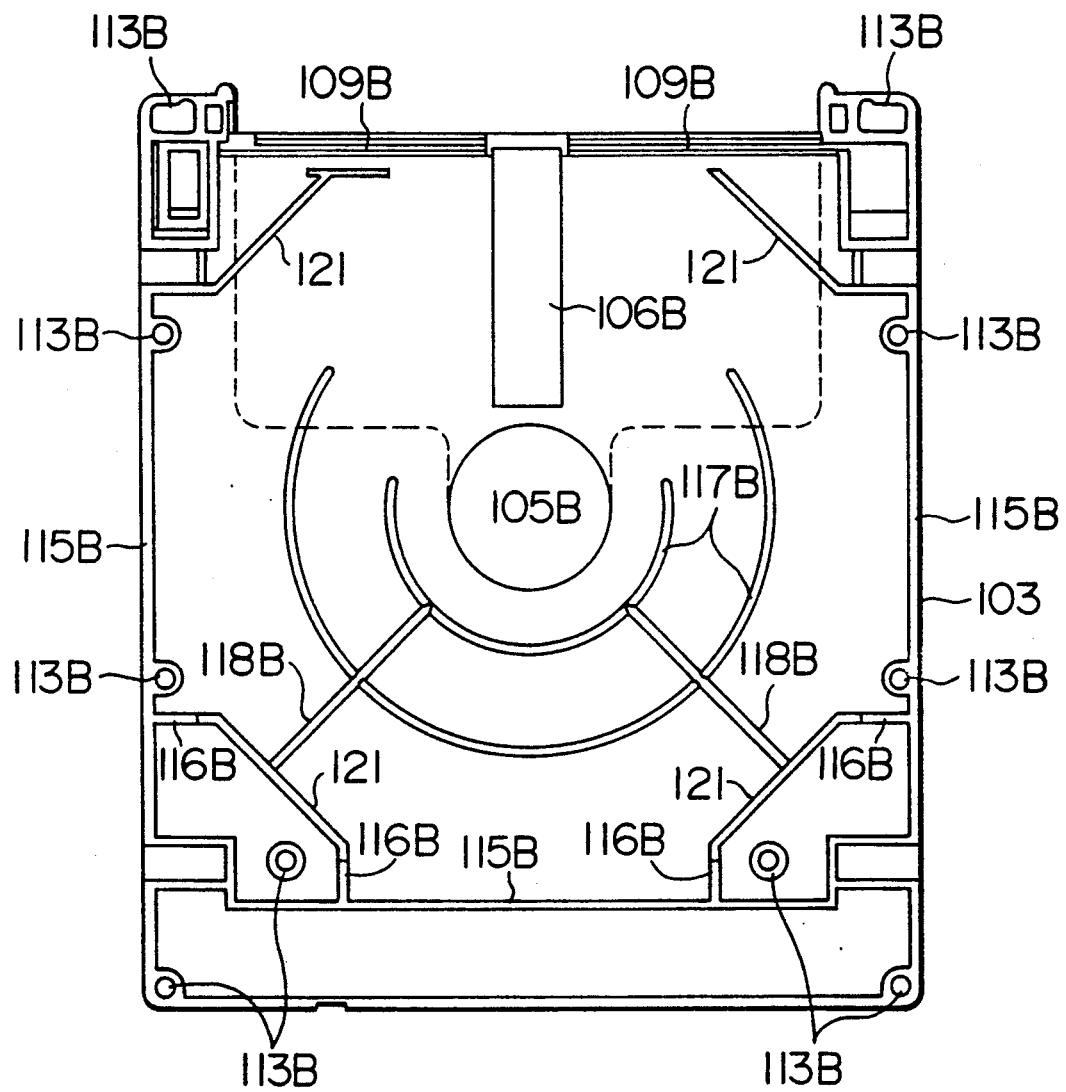

In FIGS. 14 and 15, another embodiment of the present cartridge case is shown, where FIG. 14(a) shows a plan view of an upper case, FIG. 14(b) shows a back side plan view of the upper case, FIG. 15(a) shows a back side plan view of a lower case, and FIG. 15(b) is a plan view of the lower case, and numeral 102 shows the upper case, 103 the lower case, 105A and 105B are spindle openings, 106A and 106B are head insert openings, 111A and 111B shutter sliding sections, 113A melt adhesion ribs, 113B melt adhesion bosses, 115A and 115B side walls, 116A and 116B walls, 117A and 117B arc ribs, 118A and 118B radial ribs and 121 partition walls.

In FIG. 14, the upper case 102 is provided with the spindle opening 115A approximately at the center, and the head insert opening 106A is provided at the position toward the front side of the upper case 102 from the spindle opening 105A, that is, on the upper side in FIG. 14.

On the outside surface of the upper case 102 the shutter sliding section 111A is provided in a flat recess form in a region toward the front side of the upper case from the spindle opening 105A. The shutter sliding section 111A is in an approximately rectangular form and has the head insert opening 106A therein. On the back side of the shutter sliding section 111A, that is, the inside surface of the upper case 102, a guide groove 109A extending to both side ends is provided near the front edge side of the upper case 102, as shown in FIG. 14(b).

On the inside surface of the upper case 102 a plurality of arc ribs 117A are concentrically provided around the spindle opening 105A, as shown in FIG. 14(b) and a plurality of the radial ribs 118A are inwardly extended from the side wall 115A to take a radial form toward the spindle opening 105A. These arc ribs 117A and the radial ribs 118A are lower than the side wall 115A.

The lower case 103 has substantially the same outside surface and inside surface as those of the upper case 102, as shown in FIGS. 15(a) and 15(b), where suffix A to the reference numerals are changed only to B in the corresponding members to those in FIGS. 14(a) and 14(b). On the inside surface of the lower case 103, however, partition walls 121 are provided at the tip ends of the walls 116B projected from the side wall 115B so as to isolate the four corners of the lower case 103. The partition walls 121 are higher than the side wall 115B or the walls 116B.

Figure 16A:
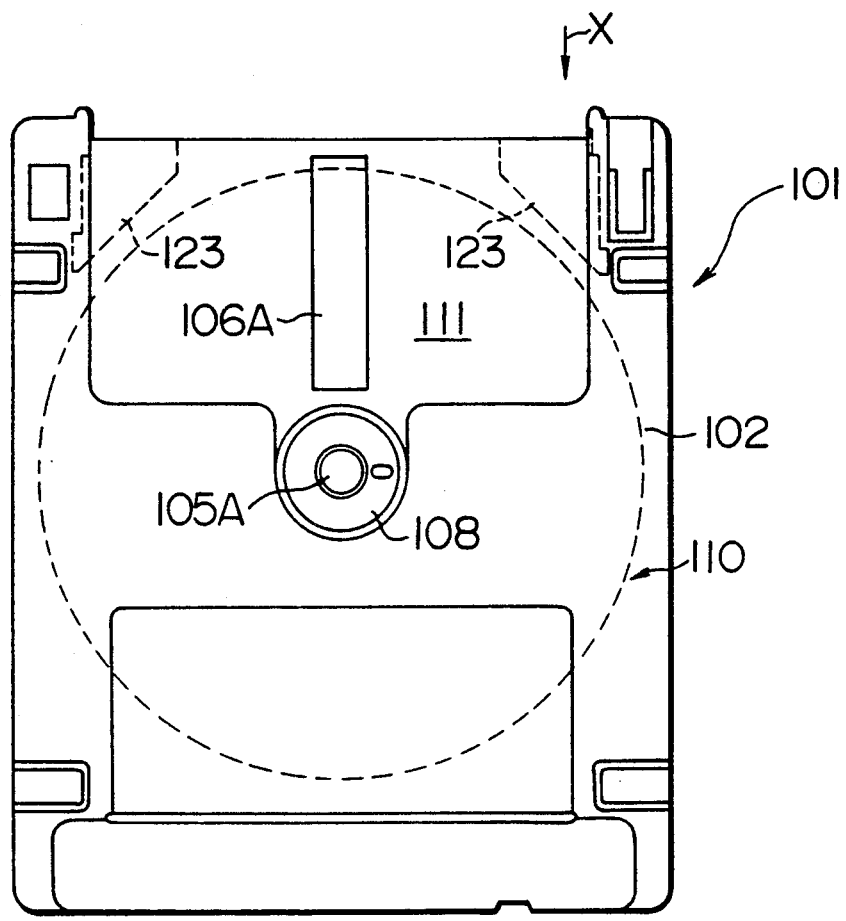
FIGS. 16(a) and (b) represent a plan view and a front edge side view of the disc cartridge case, respectively.
Figure 16B:
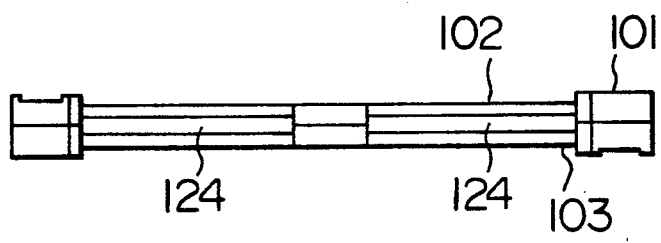

FIG. 16(a) shows the cartridge case 101, as viewed from the side of the upper case 102 and FIG. 16(b) shows the cartridge case, as viewed from the direction indicated by the arrow mark "X" in FIG. 16(a). As shown in FIG. 16(b), slits 124 are separately provided on both right and left sides on the front edge side of the cartridge case 101. These slits 124 make open parts of the triangular sections 123 [see FIG. 16(a)] formed on the outside of the partition walls 121 [see FIG. 15(b)], and spring members, as will be described later, are inserted into the triangular sections 123.

Figure 17:
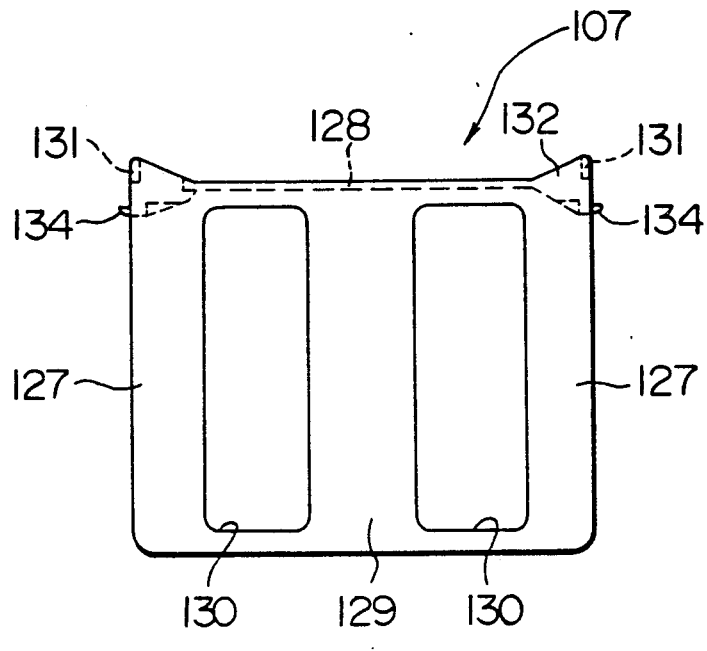
FIGS. 17, 18 and 19 are a front plan view, a top side view and an edge side view of a shutter, respectively.
Figure 18:
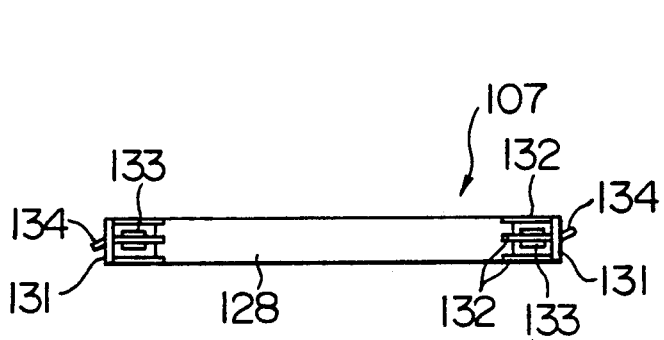
Figure 19:
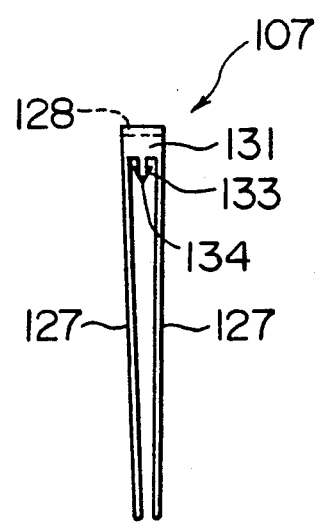

FIGS. 17, 18 and 19 are a front plan view, a top side view and an edge side view of the shutter 107, respectively. The shutter 107 is molded to a very small thickness from the afore-mentioned synthetic resin material, for example, a synthetic resin material consisting of polypropylene homopolymer containing 0.1% by weight of acrylic acid as a crystal nucleating agent and 0.15% by weight of benzoyl peroxide as a stabilizer.

In FIGS. 17 to 19, reference numerals 127 are shutter side members provided to face each other through a linking bridge member 128 to make a U shape as viewed from the edge side.

The shutter side members 127 are each provided with a cover region 129 at the center and open regions 130 on the both sides of the cover region 129, as shown in FIG. 17. At both ends of the top sides of the shutter side members 127, butting parts 131 which butt the shutter-opening member of a recording-reproducing device are provided and are each reinforced with three triangular reinforcing plate members 132 provided at the inside of the individual butting parts. Among the three reinforcing plate members 132, the middle reinforcing plate member is extended downwardly, that is, along the shutter side members 127 to form an engaging lug 133, and a spring butting piece 134 is projected from one end of the engaging lug 133 so as to protrude from the side edge of the shutter side member 127.

Figure 20:
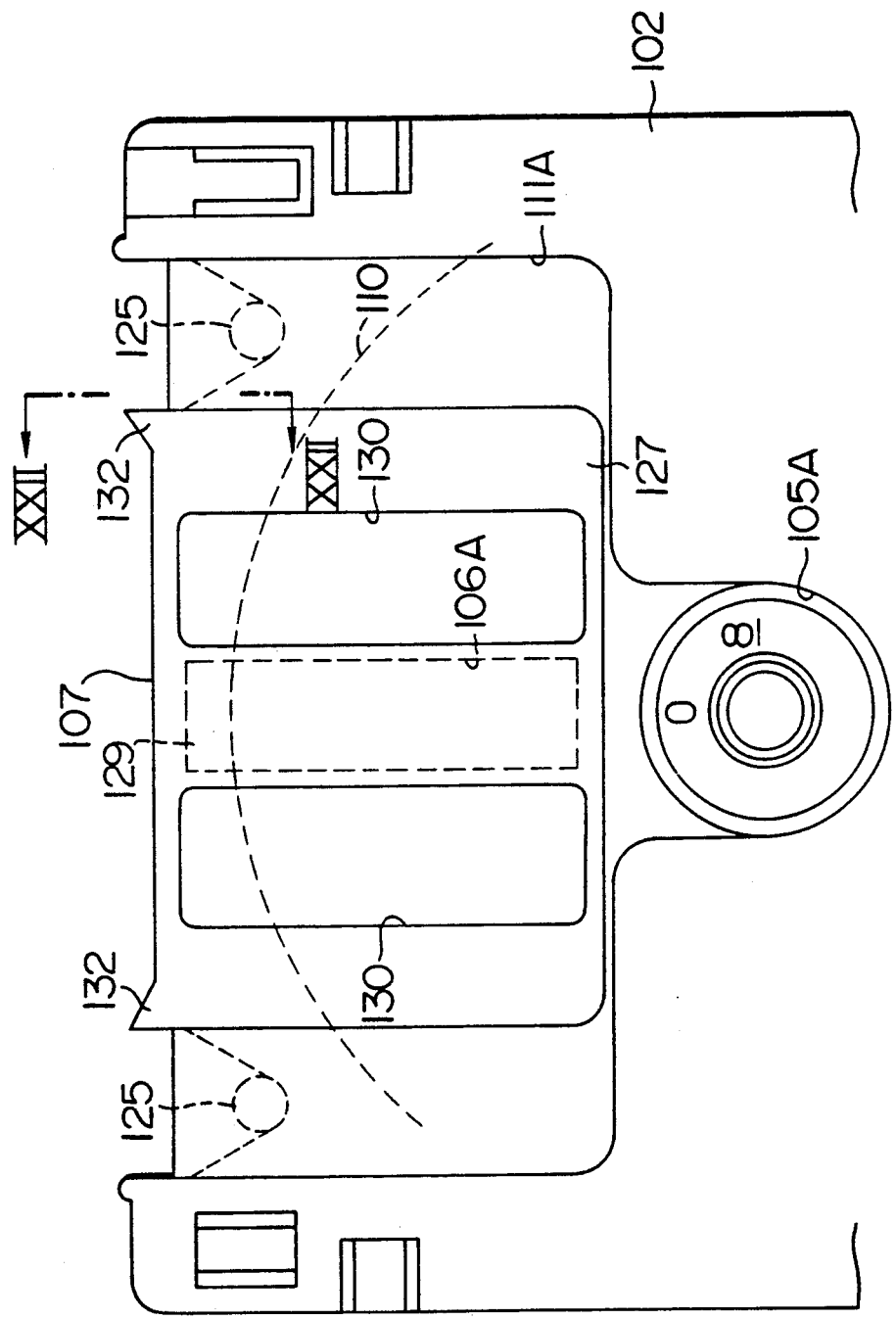
FIGS. 20 is a partially enlarged plan view of the disc cartridge case in engagement with the shutter.
Figure 21:
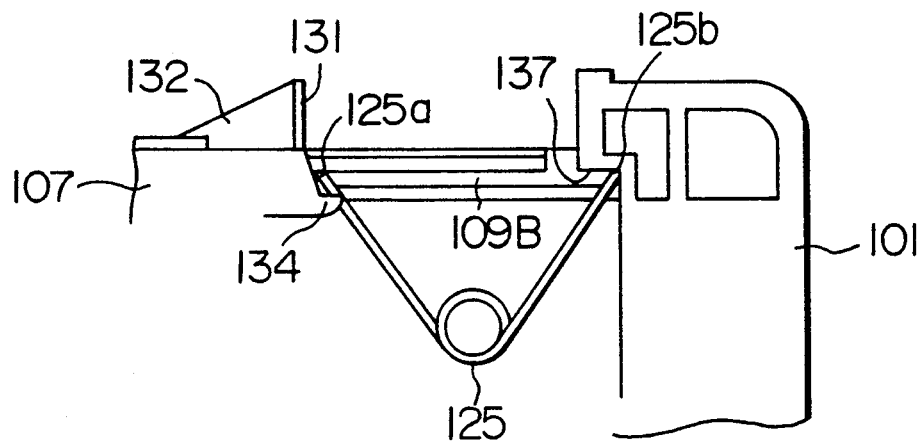
FIG. 21 is a view showing the engagement relationship among the shutter, a spring member and the disc cartridge case.
Figure 22:
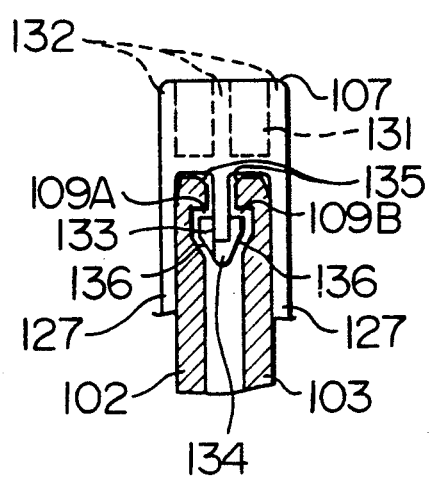
FIG. 22 is a cross-sectional view showing the engagement relationship between the shutter and the disc cartridge case along the line XXII—XXII in FIG. 20.

FIGS. 20 to 22 show an engagement mechanism among the shutter 107, the cartridge case 101 and a spring member 125.

As shown in FIG. 20, the shutter 107 is set approximately to the center of the cartridge case 101 so that the cover regions 129 of the shutter 107 can close the head insert openings 106A and 106B of the cartridge case 101, and the spring members 125 are provided on the both sides of the shutter 107.

FIG. 21 is a partially cut-away view showing the engagement mechanism among the cartridge case 101, the shutter 107 and the spring member 125. One end 125b of the spring member is engaged with the spring engaging part 137 of the cartridge case 101, while the other end 125a is resiliently butted to the spring butting part 134 of the shutter 107. When the shutter 107 is moved toward the right side in FIG. 21, the spring end 125a of the shutter 107 is guided along the guide grooves 109A and 109B, shown in FIG. 22 to elastically approach the spring end 125b. When the shutter 107 is moved toward the left side in FIG. 21, the spring end 125a is moved to a very small degree toward the farther side from the other spring end 125b and butts the spring stopper of the cartridge case 101 to leave the shutter 107.

FIG. 22 is a cross-sectional view along the line XXII—XXII in FIG. 20, showing that slopes 135 are formed on both sides of the opening end of the slit 124. On the other hand, the tip end of the engaging lug 133 is tapered as shown by 136 in FIG. 21. The engaging lug 133 slips into the slit 124 to engage with the guide grooves 109A and 109B of the upper case 102 and the lower case 103, respectively, by virtue of the joint actions of the slopes and the tapered tip end 136 and the expansion of the opening around the slit 124 between the upper case 102 and the lower case 103 and between the shutter side members 127, as shown in FIG. 22. By such engagement, the shutter 107 is prevented from leaving the cartridge case 101 and can be guided in the sliding direction along the guide grooves 109A and 109B.

Figure 23:
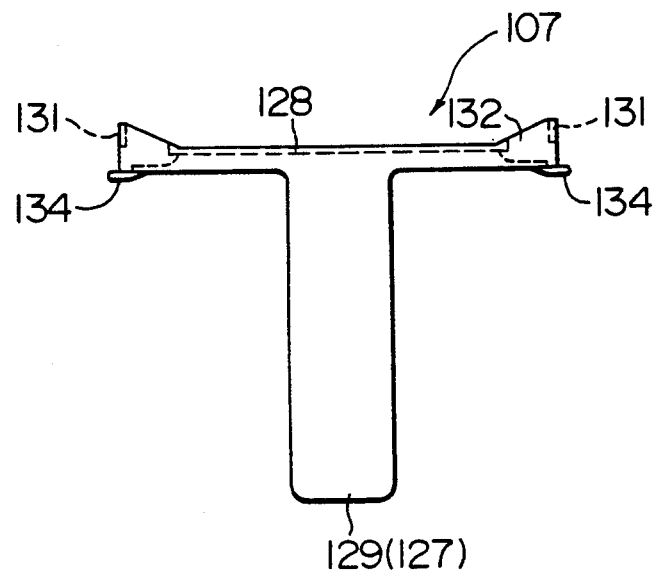
FIGS. 23, 24 and 25 represent a front view, a front edge side view and a side view of a shutter according to other embodiment of the present invention.
Figure 24:
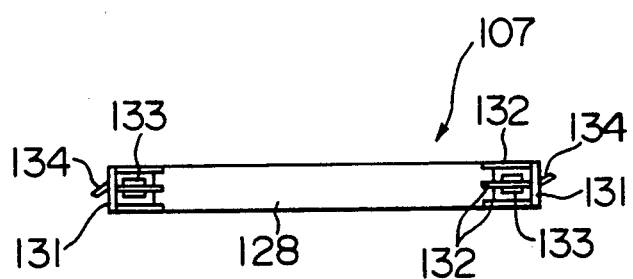
Figure 25:
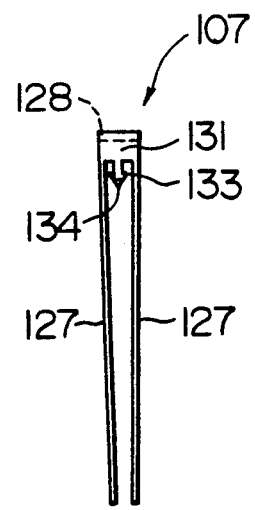

FIGS. 23 to 25 shows further embodiment of the present shutter, where only a difference from the shutter 107 shown in FIGS. 17 to 19 is that the shutter side members 127 each consist of one cover region 129, as shown in FIG. 23, and thus the side member of the shutter 107 is in a T shape. Other members are the same as in the embodiments shown in FIGS. 14 to 22, and thus are omitted from further explanation.

The following Table shows the bending modulus of elasticity and the surface hardness of shutters molded from crystalline polypropylene and crystallizable polypropylene containing a crystal nucleating agent according to the present invention in comparison, where the bending modulus of elasticity was determined according to ASTM D700 and the surface hardness (Rockwell hardness) according to ASTM D785. In the Table other mechanical properties are shown together.

TABLE

| Grade | Testing procedure (ASTM) | Unit | Crystalline polypropylene resin | Crystallizable polypropylene resin* |
|---|---|---|---|---|
| MFR | D1236 | g/10 min. | 25.0 | 24.8 |
| Tensile yield point strength | D638 | kg/cm$^2$ | 397 | 423 |
| Tensile breaking point strength | D638 | % | 29 | 26 |
| Bending strength (max.) | D790 | kg/cm$^2$ | 641 | 699 |
| Bending modulus of elasticity | D790 | kg/cm$^2$ | 21,200 | 23,800 |
| Izod Impact strength at 23° C. | D256 | kg · cm/cm | 2.3 | 2.3 |
| Izod Impact strength at −10° C. | D256 | kg · cm/cm | 2.0 | 2.1 |
| Heat transformation temperature at 66 psi | D646 | °C. | 132 | 141 |
| Surface hardness | D786 | Rockwell R | 106 | 108 |
| Water absorbability | As described before herein | wt. % | 0.02 | 0.02 |

Note: *Resin contains a crystal nucleating agent

The shutters molded from the crystalline polypropylene resin and the crystallizable polypropylene resin containing a crystal nucleating agent according to the present invention have a high bending modulus of elasticity and the surface hardness, where it can be seen that the mechanical properties including the bending modulus of elasticity and the surface hardness can be improved by the presence of a crystal nucleating agent for the following reasons. When the shutter is molded from a crystallizable resin, the crystallization of the resin further proceeds during the molding, while forming spherical crystals, but when the crystallizable resin contains a crystal nucleating agent, the growth of the spherical crystals can be prevented by the presence of the crystal nucleating agent, and a large number of very small spherical crystals are formed. The smaller the spherical crystal size, the higher the impact strength and the higher the degree of crystallization. This further leads to effective improvement of mechanical strength and prevention of molding fins.

According to the present invention, a shutter for a disc cartridge is molded from a synthetic resin material having a water absorbability of not more than 0.05% by weight and a maximum bending strength of not less than 500 kg/cm$^2$ such as crystalline propylene homopolymer, crystalline polypropylene copolymer, or crystallizable resin containing a crystal nucleating agent, and has a good resistance to deformation by an external force during the working, handling or preservation, that is, resistances to changes in shape with time; in other words, a high durability.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A disc cartridge which comprises a cartridge case having head insert openings, said cartridge case encasing a disc-type recording medium rotatably supported therein, and a shutter for opening and closing said head insertion openings mounted on said cartridge case, said shutter, having improved mechanical strength and surface hardness, being molded from a synthetic resin material selected from at least one member of the group consisting of a crystalline polypropylene homopolymer, a crystalline polypropylene copolymer, or a crystallizable resin containing a crystal nucleating agent, said synthetic resin material having a water absorbability of not more than 0.05% by weight and contains small spherical crystals.

2. A disc cartridge according to claim 1, wherein said synthetic resin material is a crystallizable polyolefin resin containing a crystal nucleating agent, such that said molded shutter contains a large number of small spherical crystals.

3. A disc cartridge according to claim 2, wherein said crystallizable polyolefin resin is polypropylene.

4. A disc cartridge according to claim 2, wherein said crystallizable polyolefin resin has a melt flow rate of not less than 20.

5. A disc cartridge according to claim 1, wherein said shutter has a U-shaped cross-section including side members and a connecting member.

6. A disc cartridge according to claim 5, wherein a shutter guide groove is provided on a front side edge of said cartridge case in parallel therewith, and an engaging lug, bent inwardly, extends from at least one of said shutter side members towards an opposite side, said engaging lug engaging with said guide groove, thereby allowing said shutter to move along said guide groove.

7. A disc cartridge according to claim 5, wherein an engaging lug is projected from an inside surface of said shutter connecting member, an engaging member for engaging with said engaging lug of said shutter is formed on an inside surface at a front side edge of said cartridge case, and said engaging lug of said shutter engages with said engaging member, thereby allowing said shutter to move along said engaging member.

8. A shutter for a disc cartridge which encases a disc-type recording medium, said shutter comprising a molded synthetic resin material selected from at least one member of the group consisting of a crystalline polypropylene homopolymer, a crystalline polypropylene copolymer, or a crystalline resin containing a crystal nucleating agent, said synthetic resin material having a water absorbability of not more than 0.05% by weight and contains small spherical crystals.

9. The shutter of claim 8, wherein said synthetic resin material is a crystallizable polyolefin resin containing a crystal nucleating agent, such that said molded shutter contains a large number of small spherical crystals.

10. The shutter of claim 9, wherein said crystallizable polyolefin resin in polypropylene.

11. The shutter of claim 8, wherein said crystallizable resin has a melt flow rate of not less than 20.

12. The shutter of claim 8, wherein said synthetic resin material is a crystallizable polypropylene homopolymer containing a crystal nucleating agent, such that said molded shutter contains a large number of small spherical crystals.

13. The shutter of claim 8, further including a hydroxy-4-alkylbenzophenone represented by the formula:

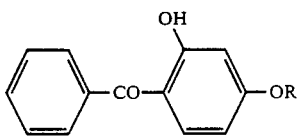

wherein R represents a hydrogen atom or an alkyl group having 1 to 20 carbon atoms, in combination with said synthetic resin material whereby resistance to deterioration by said shutter is enhanced.

14. A disc cartridge which comprises a cartridge case having head insert openings, said cartridge case encasing a disc-type recording medium rotatably supported therein, and a shutter for opening and closing said head insertion openings mounted on said cartridge case, said shutter, having improved mechanical strength and surface hardness, being molded from a synthetic resin material comprising a crystallizable polyolefin resin containing a crystal nucleating agent such that said molded shutter contains a large number of small spherical crystals, said synthetic resin material having a water absorbability of not more than 0.05% by weight.

15. The disc cartridge according to claim 14, wherein said crystallizable polyolefin resin is polypropylene.

16. A shutter for a disc cartridge which encases a disc-type recording medium, said shutter comprising a molded synthetic resin material having a water absorbability of not more than 0.05% by weight and improved mechanical strength and surface hardness, said synthetic resin consisting essentially of a crystallizable polyolefin resin containing a crystal nucleating agent, such that said molded shutter contains a large number of smaller spherical crystals.

17. The shutter according to claim 16, wherein said crystallizable polyolefin resin is polypropylene.

18. The shutter of claim 18, further including a hydroxy-4-alkylbenzophenone represented by the formula:

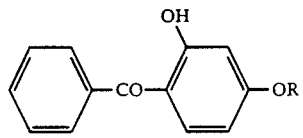

wherein R represents a hydrogen atom or an alkyl group having 1 to 20 carbon atoms, whereby resistance to deterioration is enhanced.

19. The shutter of claim 18, said hydroxy-4-alkylbenzophenone being selected from at least one member of the group consisting of 2-hydroxy-4-octoxybenzophenone wherein R is $C_8H_{17}$, 2-hydroxy-4-dodecyloxybenzophenone wherein R is $C_{12}H_{25}$, and 2-hydroxy-4-octadecyloxybenzophenone wherein R is $C_{18}H_{27}$.

20. The shutter of claim 18, wherein said hydroxy-4-alkylbenzophenone is present in an amount of from about 0.1 to 8 parts by weight per 100 parts by weight of said crystallizable polyolefin resin and filler.

* * * * *